US007023006B2

(12) United States Patent
Daniel et al.

(10) Patent No.: US 7,023,006 B2
(45) Date of Patent: Apr. 4, 2006

(54) METHOD FOR SHADING AN OPTICAL SENSING ELEMENT SUCH AS IN A SCANNER

(75) Inventors: Stuart W. Daniel, Lexington, KY (US); Steven F. Weed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 112 days.

(21) Appl. No.: 10/746,611

(22) Filed: Dec. 22, 2003

(65) Prior Publication Data

US 2005/0133742 A1 Jun. 23, 2005

(51) Int. Cl.
*G01V 8/00* (2006.01)

(52) U.S. Cl. ............................... 250/559.1; 250/559.45

(58) Field of Classification Search ................ 358/493, 358/496, 498; 250/559.1, 559.45, 559.4, 250/234, 235, 252.1
See application file for complete search history.

(56) References Cited

U.S. PATENT DOCUMENTS 6,518,587 B1 * 2/2003 Rombola ................. 250/559.1

* cited by examiner

*Primary Examiner*—Thanh X. Luu
*Assistant Examiner*—Tony Ko
(74) *Attorney, Agent, or Firm*—Thompson Hine LLP; Christine K. Garcia

(57) ABSTRACT

Method for shading an optical sensing element of an optical sensor. Reference values are sequentially obtained of the output signal of the sensing element while relatively moving the optical sensor including the sensing element over a shading reference target. An edge detection filter is applied to each of the reference values obtained in step a) in determining if each of the reference values is or is not from an optical defect on the shading calibration strip. An average is calculated of the reference values obtained while excluding each of the reference values determined to be from any optical defect in calculating the average. The output signal of the sensing element is calibrated to the shading reference target using at least the calculated average.

20 Claims, 1 Drawing Sheet

METHOD FOR SHADING AN OPTICAL SENSING ELEMENT SUCH AS IN A SCANNER

TECHNICAL FIELD

The present invention relates generally to optical sensing elements, such as optical sensing elements of a scan bar of an optical scanner, and more particularly to a method for shading an optical sensing element.

BACKGROUND OF THE INVENTION

Scanners may be used to scan an image to create a scanned image which can be displayed on a computer monitor, which can be used by a computer program, which can be printed, which can be faxed, etc. One conventional method for scanning an image uses a scanner having a subscan axis, a scan bar having sensor elements (such as CCD [charge-coupled-device] elements), and a scan-bar shading calibration strip having a white area and optionally a black area.

It is noted that each optical sensing element may produce a signal proportional to the amount of light reaching the element. The proportion or "gain" of each element may be related but not necessarily identical. In addition, the light source may not uniformly illuminate the document to be scanned. To get an image with a consistent representation, the elements should be individually calibrated (also referred to as "shaded") using a calibration strip with a white area and optionally a black area.

To perform shading, the scan bar, including the sensor elements, may be moved along the subscan axis over the white area (and optionally over the black area) of the shading calibration strip, and reference values of the output signal of the sensor elements may be obtained. The white-area reference values (and optionally also the black-area reference values) for a particular sensor element may be used to calibrate that sensor element. In one known method, the average of all of the white-area reference values for a particular sensor element is used to calibrate the particular sensor element to the white area of the shading calibration strip. Calibration may provide a revised gain for each CCD element to compensate for varying amounts of illumination produced by a scanner light source in different regions of a scanned image and to compensate for variations among the CCD elements of the scan bar. However, optical defects, occlusions or blemishes, such as dust, etc., on the shading calibration strip may cause the calibration of sensor elements which pass over the optical defects to be inaccurate. When printing a scanned document, inaccurate calibration of a CCD element may result in a vertical shading artifact, wherein a printed vertical column may be brighter or darker than neighboring columns. In another known method, the white-area reference values for a particular sensor element may be arranged in a histogram, and values outside a predetermined limit may be considered to be from blemishes on the shading calibration strip and are not included in taking an average of the reference values, wherein the average is used for calibrating the particular sensor element.

It is known to apply an edge detection filter to detect the edges of scanned text in optical character recognition applications, wherein the edges are then filtered to present a sharper image.

What is needed is an improved method for shading an optical sensing element such as an optical sensing element of a scanner.

SUMMARY OF THE INVENTION

One exemplary embodiment of the invention is for shading an optical sensing element of a scan bar of an optical scanner having a shading calibration strip and includes steps a) through d). Step a) includes sequentially obtaining reference values of the output signal of the optical sensing element while relatively moving the scan bar including the optical sensing element over the shading calibration strip. Step b) includes applying an edge detection filter to each of the reference values obtained in step a) in determining if each of the reference values is or is not from an optical defect on the shading calibration strip. Step c) includes calculating an average of the reference values obtained in step a) while excluding each of the reference values determined to be from any optical defect in step b) in calculating the average. Step d) includes calibrating the output signal of the optical sensing element to the shading calibration strip using at least the average calculated in step c).

Another exemplary embodiment of the invention is for shading an optical sensing element of an optical sensor and includes steps a) through d). Step a) includes sequentially obtaining reference values of the output signal of the optical sensing element while relatively moving the optical sensor including the optical sensing element over a shading reference target. Step b) includes applying an edge detection filter to each of the reference values obtained in step a) in determining if each of the reference values is or is not from an optical defect on the shading reference target. Step c) includes calculating an average of the reference values obtained in step a) while excluding each of the reference values determined to be from any optical defect in step b) in calculating the average. Step d) includes calibrating the output signal of the optical sensing element to the shading reference target using at least the average calculated in step c).

Several benefits and advantages are derived from the invention. By using edge detection filtering, a more accurate determination is made whether an optical defect, such as a hair strand, a dust particle, a surface imperfection, etc. is or is not on the shading reference target or shading calibration strip compared to using a conventional histogram defect-detecting method. Edge detection filtering may identify particular reference values of the output signal of the optical sensing element as exceptional and may exclude them from the calibration. Such exceptional values may come from optical defects, occlusions, blemishes, instantaneous noise and the like. In one embodiment of the present invention, only one pass through the sequential reference values for a particular optical sensing element need be made to shade the optical sensing element, wherein for each reference value of the optical sensing element, edge detection filtering determines if that reference value is to be added or not added to a reference-value sum used for calculating the reference-value average for calibrating the optical sensing element.

DETAILED DESCRIPTION

Figure 1:
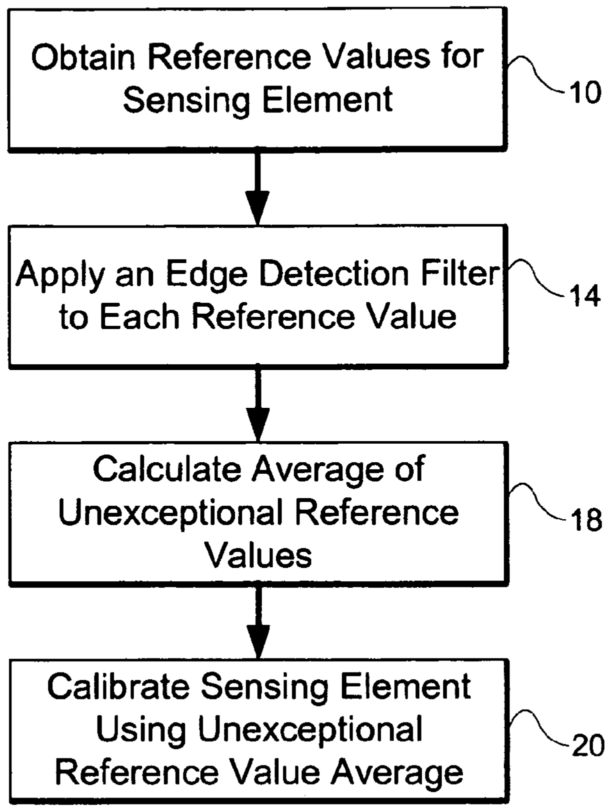
FIG. 1 is a flow diagram illustrating one embodiment according to the present invention.
Figure 2:
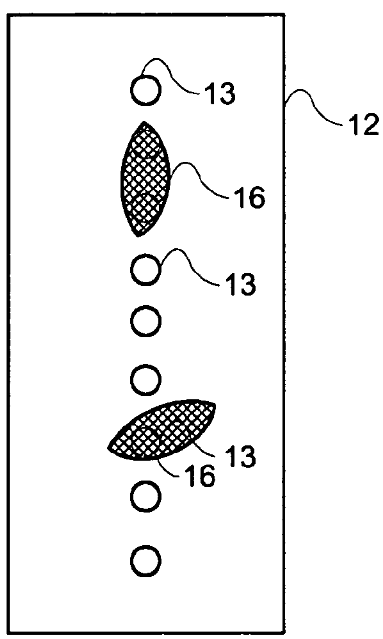
FIG. 2 is a schematic top plan view of a narrow portion of a shading calibration strip wherein circles represent the sensing area of one optical sensing element of a scan bar for different locations of the scan bar as the scan bar including the optical sensing element is moved over the shading calibration strip and wherein optical defects on the shading calibration strip are also shown.

FIGS. 1 and 2 illustrate one embodiment according to the present invention for shading an optical sensing element of a scan bar of an optical scanner (such items being conventional and not shown in the figures) which may include steps a) through d). Step a) is labeled as "Obtain Reference Values For Sensing Element" in block 10 of FIG. 1. Step a) may includes sequentially obtaining reference values of the output signal of the optical sensing element while relatively moving the scan bar including the optical sensing element over the shading calibration strip 12. It is noted that in this embodiment a shading calibration strip may be defined as an area (whether having the shape of a strip or a non-strip) of the scanner which may be adapted to be scanned by the scan bar to calibrate the output signal of each optical sensing element. In the illustration in FIG. 2 of a portion of an embodiment of the shading calibration strip 12, locations on the shading calibration strip 12 corresponding to locations from which the reference values of the output signal of the optical sensing element may be obtained while relatively moving the scan bar, including the optical sensing element, over the shading calibration strip 12 are shown as circles 13. In one example, a reference value of the output signal of an optical sensing element may range from 0 to 4095. Step b) is labeled as "Apply An Edge Detection Filter To Each Reference Value" in block 14 of FIG. 1. Step b) may include applying an edge detection filter to each of the reference values obtained in step a) in determining whether each of the reference values is or is not from an optical defect 16 on the shading calibration strip 12. Step c) is labeled as "Calculate Average Of Unexceptional Reference Values" in block 18 of FIG. 1. Step c) may include calculating an average of the reference values obtained in step a) by excluding each of the reference values determined to be from any optical defect 16 in step b) in calculating the average. Step d) is labeled as "Calibrate Sensing Element Using Unexceptional Reference Value Average" in block 20 of FIG. 1. Step d) may include calibrating the output signal of the optical sensing element to the shading calibration strip 12 using at least the average calculated in step c).

Examples of optical sensing elements may include, without limitation, CCD (charge-coupled-device) elements, CIS elements, and CMOS elements. Other examples of optical sensing elements are left to the artisan.

In one embodiment, the step of determining if the first reference value determined by step b) to be from an optical defect 16 is actually of a trailing edge of an optical defect 16 and including the step of restarting steps b) and c) at a reference value proximate and past the trailing edge of the optical defect 16 may be included. In one variation, for a light-colored calibration strip 12 and dark-colored optical defects 16 and for a high reference value indicating a lighter color and a low reference value indicating a darker color, the slope of the sequential reference values at the first reference value determined by step b) to be from an optical defect 16 is calculated. If the slope is positive, this may mean that the optical sensing element is moving from a darker-color area to a lighter-color area, that the darker-color area was an optical defect 16, that the first defect-detected reference value was from the trailing edge of the optical defect 16, and that reference values previous to the first defect-detected reference value should be disregarded and the method restarted beginning at the first defect-detected reference value. In one example, a positive reference-value slope at the first defect-detected reference value may correspond to a positive filter output of applying an edge detection filter to the first defect-detected reference value, as can be understood by those skilled in the art. Other variations and examples, such as a dark-colored calibration strip and/or high reference values indicating a darker color and/or a positive slope corresponding to a negative value of applying edge detection filtering to the first defect-detected reference value, etc., are left to the artisan.

In another embodiment, step c) includes adding a reference value, determined in step b) not to be from an optical defect, to a reference-value sum of previous reference values, determined in step b) not to be from an optical defect, before step b) determines if the next reference value is or is not from an optical defect on the shading calibration strip. In one variation, step c) increments a counter by one each time a reference value is added to the reference-value sum, and step c) calculates the average by dividing the final reference-value sum by the final value of the counter. When implemented by a computer algorithm, it is noted that in this example and variation, the algorithm needs to make only one pass through the sequential reference values to shade the optical sensing element. Other examples and variations for implementing steps b) and c) are left to the artisan.

In yet another embodiment, the shading calibration strip 12 includes a first area of a first color, wherein each optical defect consists essentially of a color optical defect disposed on the first area, and step a) moves the scan bar including the optical sensing element over the first area. Examples of optical defects which can be color optical defects against a particular color shading calibration strip include, without limitation, a hair strand, a dust particle, a surface imperfection, etc. In one variation, the first color is a white color. In one procedure, step a) moves the scan bar including the optical sensing element in a substantially straight line over the first area. Other movements of the optical sensing element over the first area are left to the artisan. In the same or another application, the shading calibration strip also includes a second area of a second color such as a black color, wherein steps b) through d) are performed on the first color to calculate a first average and are then performed on the second color to calculate a second average and wherein the optical sensing element is calibrated using at least the first and second averages.

In one illustration of applying a three-measurement edge detection filter, the sequential reference values of step a) include sequential (N−1), N and (N+1) reference values, step b) includes using a [−1, 0, +1] edge detection filter which, when applied to the N reference value, has a filter output equal to a sum of: (−1) times the (N−1) reference value; (0) times the N reference value; and (+1) times the (N+1) reference value, wherein step b) includes adding the filter output from applying the edge detection filter to the N reference value to a sum of filter outputs for previous references values yielding an N updated sum, and wherein step b) determines that the N value is from an optical defect on the shading calibration strip when the absolute value of the N updated sum exceeds a previously determined noise threshold of the optical sensing element. In one variation, the previously-determined noise threshold is a visually-previously-determined noise threshold.

In one example of the above illustration, assume a white shading calibration strip, that previous optical defects were determined to be on the strip, that the noise threshold is 300, that the range of possible values for a reference value extends from 0 (black) to 4095 (white), that the forty-seventh through the forty-ninth reference value is 4000, that the fiftieth and the fifty-first reference value is 2000, and that the fifty-second through the fifty-fourth reference value is 4000. The filter output would be 0 for the forty-eighth reference value, −2000 for the forty-ninth and fiftieth reference values, +2000 for the fifty-first and fifty-second reference value, and 0 for the fifty-third reference value. Assume the updated sum was 0. for the forty-seventh reference value. The updated sum is 0 for the forty-eighth reference value, is −2000 for the forty-ninth reference value, is −4000 for the fiftieth reference value, is −2000 for the fifty-first reference value, and is 0 for the fifty-second and fifty-third reference values. Since the absolute value of the updated sums for the forty-ninth through the fifty-first reference values exceeds the noise threshold, the forty-ninth through the fifty-first reference values are determined to be from an optical defect in step b) and are excluded in calculating the average in step c). Assume that the average calculated in step c) is 4000. Then, in one simple but non-limiting technique, the output signal of the optical sensing element would be calibrated by multiplying the output signal by a gain equal to 4095/4000. In one variation, step b) applies at least a three-measurement edge detection filter to each of the reference values obtained in step a) in determining if each of the reference values is or is not from an optical defect on the shading calibration strip. In another variation, a two-measurement edge detection filter is used. Other calibrating techniques and other examples of applying edge detection filtering to a particular reference value involving a different number of sequentially previous and/or sequentially following reference values and/or weighting magnitudes (and/or signs) are left to the artisan.

It is noted that, for purposes of describing the invention, a particular reference value caused by substantially-instantaneous electrical noise in the output signal of the optical sensing element may be equivalent to that from an optical defect on the shading calibration strip because edge filtering identifies an output signal anomaly (and the invention corrects for such) whether caused by an actual optical defect on the shading calibration strip or an apparent optical defect caused by substantially-instantaneous electrical noise in the output signal of the optical sensing element.

In still another embodiment, the scan bar of the optical scanner may include over 5,000 additional optical sensing elements, wherein steps a) through d) are repeated for each of the additional optical sensing elements.

Another embodiment of the present invention is a method for shading an optical sensing element of an optical sensor and may include steps a) through d). Step a) includes sequentially obtaining reference values of the output signal of the optical sensing element while relatively moving the optical sensor including the optical sensing element over a shading reference target. It is noted that, for this embodiment, a shading reference target is defined as an area (whether having the shape of a strip or a non-strip) which is adapted to be scanned by the optical sensor to calibrate the output signal of each optical sensing element. Step b) includes applying an edge detection filter to each of the reference values obtained in step a) in determining if each of the reference values is or is not from an optical defect on the shading reference target. Step c) includes calculating an average of the reference values obtained in step a) while excluding each of the reference values determined to be from any optical defect in step b) in calculating the average. Step d) includes calibrating the output signal of the optical sensing element to the shading reference target using at least the average calculated in step c).

The examples, variations, implementations, etc., previously described are equally applicable to all exemplary embodiments of the present invention.

Several benefits and advantages are derived from the exemplary embodiments of the invention. By using edge detection filtering, a more accurate determination is made whether an optical defect, such as a hair strand, a dust particle, a surface imperfection, etc. is or is not on the shading reference target or shading calibration strip compared to using a conventional histogram defect-detecting method. Edge detection filtering identifies particular reference values of the output signal of the optical sensing element as being exceptional and excludes them from the calibration. In one exemplary embodiment, only one pass through the sequential reference values for a particular optical sensing element need be made to shade the optical sensing element, wherein for each reference value of the optical sensing element, edge detection filtering determines if that reference value is to be added or not added to a reference-value sum used for calculating the reference-value average for calibrating the optical sensing element.

The foregoing description of several methods of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for shading an optical sensing element of a scan bar of an optical scanner having a shading calibration strip comprising the steps of:

a) sequentially obtaining reference values of the output signal of the optical sensing element while relatively moving the scan bar including the optical sensing element over the shading calibration strip;

b) applying an edge detection filter to each of the reference values obtained in step a) in determining if each of the reference values is or is not from an optical defect on the shading calibration strip;

c) calculating an average of the reference values obtained in step a) while excluding each of the reference values determined to be from an optical defect in step b) in calculating the average; and d) calibrating the output signal of the optical sensing element to the shading calibration strip using at least the average calculated in step c).

2. The method of claim 1, wherein the shading calibration strip includes a first area of a first color, wherein each optical defect consists essentially of a color optical defect disposed on the first area, and wherein step a) moves the scan bar including the optical sensing element over the first area.

3. The method of claim 2, wherein the first color is a white color.

4. The method of claim 3, wherein step a) moves the scan bar including the optical sensing element in a substantially straight line over the first area.

5. The method of claim 1, wherein the sequential reference values of step a) include sequential (N−1), N and (N+1) reference values, wherein step b) includes using a [−1, 0, +1] edge detection filter which, when applied to the N reference value, has a filter output equal to a sum of: (−1) times the (N−1) reference value; (0) times the N reference value; and (+1) times the (N+1) reference value, wherein the filter output from applying the edge detection filter to the N reference value is added to a sum of filter outputs for previous reference values yielding an N updated sum, and wherein step b) determines that the N reference value is from an optical defect on the shading calibration strip when the absolute value of the N updated sum exceeds a previously determined noise threshold of the optical sensing element.

6. The method of claim 1, wherein step b) applies at least a three-measurement edge detection filter to each of the reference values obtained in step a) in determining if each of the reference values is or is not from an optical defect on the shading calibration strip.

7. The method of claim 1, wherein step a) moves the scan bar including the optical sensing element in a substantially straight line over the first area.

8. A method for shading an optical sensing element of a scan bar of an optical scanner having a shading calibration strip comprising the steps of:

a) seciuentially obtaining reference values of the output signal of the optical sensing element while relatively moving the scan bar including the optical sensing element over the shading calibration strip;

b) applying an edge detection filter to each of the reference values obtained in step a) in determining if each of the reference values is or is not from an optical defect on the shading calibration strip;

c) calculating an average of the reference values obtained in step a) while excluding each of the reference values determined to be from an optical defect in step b) in calculating the average; and d) calibrating the output signal of the optical sensing element to the shading calibration strip using at least the average calculated in step c); and also including the step of determining if the first reference value determined by step b) to be from an optical defect is actually of a trailing edge of an optical defect and including the step of restarting steps b) and c) at a reference value at or past the trailing edge of the optical defect.

9. The method of claim 8, wherein step c) includes adding a reference value, determined in step b) not to be from an optical defect, to a reference-value sum of previous reference values, determined in step b) not to be from an optical defect, before step b) determines if the next reference value is or is not from an optical defect on the shading calibration strip.

10. The method of claim 9, wherein step c) increments a counter by one each time a reference value is added to the reference-value sum, and wherein step c) calculates the average by dividing the final reference-value sum by the final value of the counter.

11. A method for shading an optical sensing element of an optical sensor comprising the steps of:

a) sequentially obtaining reference values of the output signal of the optical sensing element while relatively moving the optical sensor including the optical sensing element over a shading reference target;

b) applying an edge detection filter to each of the reference values obtained in step a) in determining if each of the reference values is or is not from an optical defect on the shading reference target;

c) calculating an average of the reference values obtained in step a) while excluding each of the reference values determined to be from an optical defect in step b) in calculating the average; and d) calibrating the output signal of the optical sensing element to the shading reference target using at least the average calculated in step c).

12. The method of claim 11, wherein the shading calibration strip includes a first area of a first color, wherein each optical defect consists essentially of a color optical defect disposed on the first area, and wherein step a) moves the optical sensor including the optical sensing element over the first area.

13. The method of claim 12, wherein the first color is a white color.

14. The method of claim 13, wherein step a) moves the optical sensor including the optical sensing element in a substantially straight line over the first area.

15. The method of claim 11, wherein the sequential reference values of step a) include sequential (N−1), N and (N+1) reference values, wherein step b) includes using a [−1, 0, +1] edge detection filter which, when applied to the N reference value, has a filter output equal to a sum of: (−1) times the (N−1) reference value; (0) times the N reference value; and (+1) times the (N+1) reference value, wherein the filter output from applying the edge detection filter to the N reference value is added to a sum of filter outputs for previous reference values yielding an N updated sum, and wherein step b) determines that the N reference value is from an optical defect on the shading reference target when the absolute value of the N updated sum exceeds a previously determined noise threshold of the optical sensing element.

16. The method of claim 11, wherein step b) applies at least a three-measurement edge detection filter to each of the reference values obtained in step a) in determining if each of the reference values is or is not from an optical defect on the shading reference target.

17. The method of claim 11, wherein step a) moves the optical sensor including the optical sensing element in a substantially straight line over the first area.

18. A method for shading an optical sensing element of an optical sensor comprising the steps of:

a) sequentially obtaining reference values of the output signal of the optical sensing element while relatively moving the optical sensor including the optical sensing element over a shading reference target;

b) applying an edge detection filter to each of the reference values obtained in step a) in determining if each of the reference values is or is not from an optical defect on the shading reference target;

c) calculating an average of the reference values obtained in step a) while excluding each of the reference values determined to be from an optical defect in step b) in calculating the average; and d) calibrating the output signal of the optical sensing element to the shading reference target using at least the average calculated in step c); and also including the step of determining if the first reference value determined by step b) to be from an optical defect is actually of a trailing edge of an optical defect and including the step of restarting steps b) and c) at a reference value at or past the trailing edge of the previous optical defect.

19. The method of claim 18, wherein step c) includes adding a reference value, determined in step b) not to be from an optical defect, to a reference-value sum of previous reference values, determined in step b) not to be from an optical defect, before step b) determines if the next reference value is or is not from an optical defect on the shading reference target.

20. The method of claim 19, wherein step c) increments a counter by one each time a reference value is added to the reference-value sum, and wherein step c) calculates the average by dividing the final reference-value sum by the final value of the counter.

* * * * *